(12) United States Patent
Luo et al.

(10) Patent No.: US 11,081,294 B2
(45) Date of Patent: *Aug. 3, 2021

(54) ENERGY STORAGE DEVICE

(71) Applicants: Tsinghua University, Beijing (CN); HON HAI PRECISION INDUSTRY CO., LTD., New Taipei (TW)

(72) Inventors: Zhi-Ling Luo, Beijing (CN); Chang-Hong Liu, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/871,227

(22) Filed: May 11, 2020

(65) Prior Publication Data
US 2020/0365336 A1 Nov. 19, 2020

(30) Foreign Application Priority Data
May 17, 2019 (CN) .......................... 201910413403.1

(51) Int. Cl.
*H01G 11/36* (2013.01)
*H01G 11/52* (2013.01)
*H01G 11/26* (2013.01)
*H01M 12/08* (2006.01)
*H01M 50/449* (2021.01)

(52) U.S. Cl.
CPC ............. *H01G 11/36* (2013.01); *H01G 11/26* (2013.01); *H01G 11/52* (2013.01); *H01M 12/08* (2013.01); *H01M 50/449* (2021.01)

(58) Field of Classification Search
CPC ......... H01G 11/36; H01G 11/30; H01G 11/54
See application file for complete search history.

(56) References Cited

U.S. PATENT DOCUMENTS

| | | | |
|---|---|---|---|
| 2002/0119368 A1* | 8/2002 | Tzeng | H01M 12/06 429/137 |
| 2002/0142203 A1* | 10/2002 | Ma | H01M 4/12 429/406 |
| 2005/0019651 A1* | 1/2005 | Tsai | H01M 4/86 429/72 |
| 2005/0181275 A1* | 8/2005 | Jang | H01M 6/12 429/188 |
| 2009/0195964 A1* | 8/2009 | Matsumura | H01G 9/02 361/502 |
| 2018/0212245 A1* | 7/2018 | Isii | H01M 10/0525 |
| 2020/0234890 A1* | 7/2020 | Luo | H01G 11/04 |
| 2020/0234892 A1* | 7/2020 | Luo | H01G 11/38 |
| 2020/0287222 A1* | 9/2020 | Luo | H01M 50/414 |
| 2020/0388444 A1* | 12/2020 | Luo | H01G 11/36 |

\* cited by examiner

*Primary Examiner* — Dion Ferguson
(74) *Attorney, Agent, or Firm* — ScienBiziP, P.C.

(57) ABSTRACT

An energy storage device is provided which includes a supercapacitor first electrode, a supercapacitor second electrode, a first electrolyte, a metal electrode, and a separator. The supercapacitor first electrode, the supercapacitor second electrode, and the first electrolyte together form a supercapacitor. The metal electrode and the supercapacitor second electrode form an Ohmic contact. The separator is sandwiched between the metal electrode and the supercapacitor first electrode and configured to absorb moisture in a surrounding environment.

15 Claims, 5 Drawing Sheets

ENERGY STORAGE DEVICE

FIELD

The present disclosure relates to the field of energy storage.

BACKGROUND

Supercapacitors are promising energy storage devices with a capacitance value much higher than other capacitors, but with lower voltage limits. However, supercapacitors can only store but not harvest energy.

What is needed, therefore, is an energy storage device which can both harvest and store energy.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
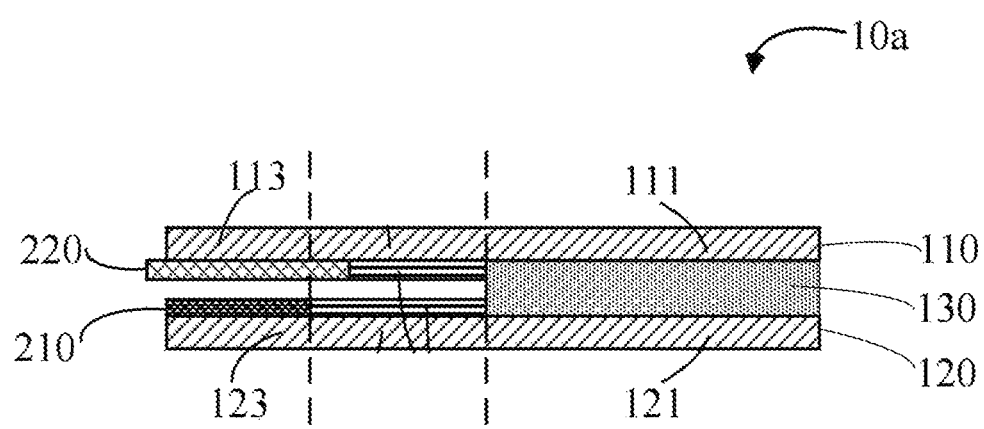
FIG. 1 is a structural schematic view of one embodiment of an energy storage device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to be better illustrate details and features. The description is not to be considered as limiting the scope of the embodiments described herein.

Several definitions that apply throughout this disclosure will now be presented.

The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 shows an embodiment of an energy storage device 10a. The energy storage device 10a includes a supercapacitor first electrode 110, a supercapacitor second electrode 120, a first electrolyte 130, a metal electrode 210, and a separator 220.

The supercapacitor first electrode 110 and the supercapacitor second electrode 120 are substantially parallel to and spaced apart from each other. The supercapacitor first electrode 110, the supercapacitor second electrode 120, and the first electrolyte 130 together form a supercapacitor. The metal electrode 210 and the supercapacitor second electrode 120 form an Ohmic contact. The metal electrode 210 is spaced apart from and opposite to the supercapacitor first electrode 110. The metal electrode 210 and the supercapacitor first electrode 110 are configured as a negative electrode and a positive electrode of a metal-air cell, respectively.

In one embodiment, the supercapacitor first electrode 110 and the supercapacitor second electrode 120 each include a carbon nanotube/polyaniline (CNT/PANI) composite film.

The CNT/PANI composite film includes a carbon nanotube network structure and a polyaniline layer. The carbon nanotube network structure includes a plurality of carbon nanotubes combined by van der Waals attractive force therebetween and forming a free-standing film network. The term "free-standing" includes, but is not limited to, a structure that does not have to be supported by a substrate and can sustain its own weight when it is hoisted by a portion of the structure without any significant damage to its structural integrity. The free-standing property is achieved only due to the van der Waals attractive force between adjacent carbon nanotubes. The carbon nanotube network structure includes a plurality of micropores defined by adjacent carbon nanotubes. A size of the plurality of micropores may be in a range from about 60 nm to about 400 nm.

The polyaniline layer is coated on a surface of the carbon nanotube network structure. The polyaniline layer wraps around the plurality of carbon nanotubes. The carbon nanotube network structure serves as the core and the template to support the polyaniline layer. The CNT/PANI composite film is thin, light-weight, and flexible because of the plurality of carbon nanotubes and micropores.

The size and shape of the supercapacitor first electrode 110 and the supercapacitor second electrode 120 may be substantially the same. The lengths of the supercapacitor first electrode 110 and the supercapacitor second electrode 120 may range from about 20 mm to about 90 mm, the widths of the supercapacitor first electrode 110 and the supercapacitor second electrode 120 may range from about 5 mm to about 20 mm, and a thickness of each of the supercapacitor first electrode 110 and the supercapacitor second electrode 120 may range from about 50 μm to about 200 μm.

In one embodiment, the supercapacitor first electrode 110 and the supercapacitor second electrode 120 are rectangular sheets with a length of about 45 millimeter, a width of about 10 millimeter, and a thickness of about 100 micrometer.

The supercapacitor first electrode 110 includes a first surface and a second surface opposite to the first surface, and the first surface is spaced apart from and opposite to the supercapacitor second electrode 120. Similarly, the supercapacitor second electrode 120 includes a first surface and a second surface opposite to the first surface, and the second surface is spaced apart from and opposite to the supercapacitor first electrode 110.

The supercapacitor first electrode 110 may be further divided into a first portion 111 and a second portion 113, where the first portion 111 is spaced apart from the second portion 113. Similarly, the supercapacitor second electrode 120 may be further divided into a third portion 121 and a fourth portion 123, where the third portion 121 is spaced apart from the fourth portion 123.

The size and shape of the first portion 111 may be substantially the same as that of the third portion 121. The first portion 111 is spaced apart from and opposite to the third portion 121 to form a first gap. The first electrolyte 130 is filled into the first gap. The first electrolyte 130 can be a supercapacitor electrolyte, such as a polyvinyl alcohol/$H_2SO_4$ ($PVA/H_2SO_4$) gel electrolyte. The first portion 111, the third portion 121, and the first electrolyte 130 together form a supercapacitor block 100.

The size and shape of the second portion 113 may be substantially the same as that of the fourth portion 123. The second portion 113 is spaced apart from and opposite to the fourth portion 123. The metal electrode 210 is located on a surface of the fourth portion 123. In one embodiment, the metal electrode 210 is spaced apart from and opposite to the second portion 113. The material of the metal electrode 210 can be magnesium, aluminum, zinc, iron, or the like. The length and width of the metal electrode 210 may be the same as that of the fourth portion 123. The thickness of the metal electrode 210 may be in a range from about 25 μm to about 100 μm. In one embodiment, the metal electrode 210 is an aluminum foil with a thickness of about 50 μm.

Figure 2:
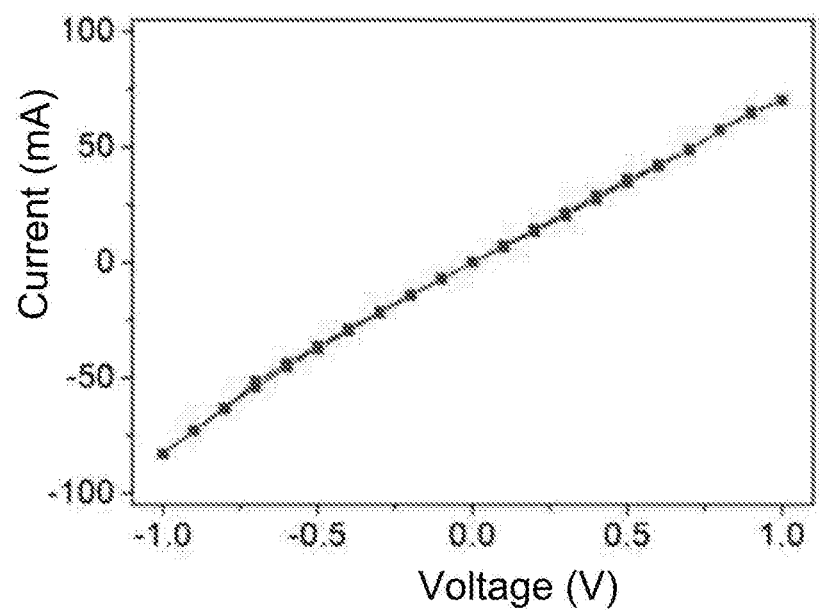
FIG. 2 is a current-voltage curve of a contact junction formed by a metal electrode and a supercapacitor second electrode.

The metal electrode 210 and the fourth portion 123 are Ohmic contacted at a junction. A conductive adhesive can be sandwiched between the metal electrode 210 and the fourth portion 123. In one embodiment, the conductive adhesive is silver paste. FIG. 2 shows a current-voltage curve of the silver paste assisted junction. In FIG. 2 the current-voltage curve approximates a straight line which shows that the metal electrode 210 and the fourth portion 123 are Ohmic contacted.

The separator 220 is sandwiched between the metal electrode 210 and the supercapacitor first electrode 110. In one embodiment, the separator 220 is closely attached to the metal electrode 210 and the supercapacitor first electrode 110. The separator 220 can continuously absorb moisture in the surrounding environment, and also prevent the metal electrode 210 from directly contacting the supercapacitor first electrode 110. When the separator 220 has absorbed moisture, the metal electrode 210 and the supercapacitor first electrode 110 are electrically conducted to form a metal-air battery.

In one embodiment, the separator 220 includes a battery separator and a plurality of hygroscopic particles. The plurality of hygroscopic particles is located on the surface and inner pores of the battery separator. The hygroscopic particles can be anhydrous calcium chloride particles, anhydrous calcium sulfate particles, anhydrous magnesium sulfate particles, anhydrous sodium sulfate particles, anhydrous potassium carbonate particles, or the like.

A method for making the separator 220 is provided according to one embodiment. The method includes, at least the following blocks:

S1, soaking a metal-air battery separator in a solution with a hygroscopic solute; and S2, removing the solution and drying the metal-air battery separator.

In S1, the hygroscopic solute can be an ionic compound, such as calcium chloride, calcium sulfate, magnesium sulfate, sodium sulfate, potassium carbonate, and the like.

In one embodiment, the hygroscopic solute is calcium chloride, and the solution is a calcium chloride solution. The metal-air battery separator is a piece of qualitative test paper.

In S2, after drying the metal-air battery separator, the surface and inner pores of the metal-air battery separator contain a plurality of hygroscopic particles, such as anhydrous calcium chloride particles. The hygroscopic particles can absorb moisture in the surrounding environment in a short time to form a metal-air battery electrolyte 230 as shown in FIG. 4.

Figure 3:
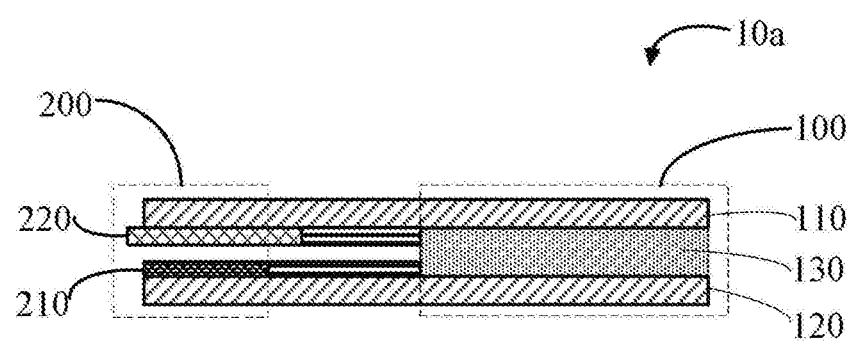
FIG. 3 is another schematic view of the energy storage device in FIG. 1.

FIG. 3 shows the energy storage device 10a may be further divided into a supercapacitor block 100 and a metal-air cell block 200 according to functions.

The supercapacitor block 100 includes the supercapacitor first electrode 110, the supercapacitor second electrode 120, and the first electrolyte 130. The metal-air cell block 200 includes the supercapacitor first electrode 110, the metal electrode 210, and the separator 220. The supercapacitor first electrode 110 serves as an electrode of the supercapacitor block 100 and a positive electrode of the metal-air cell block 200, simultaneously.

Figure 4:
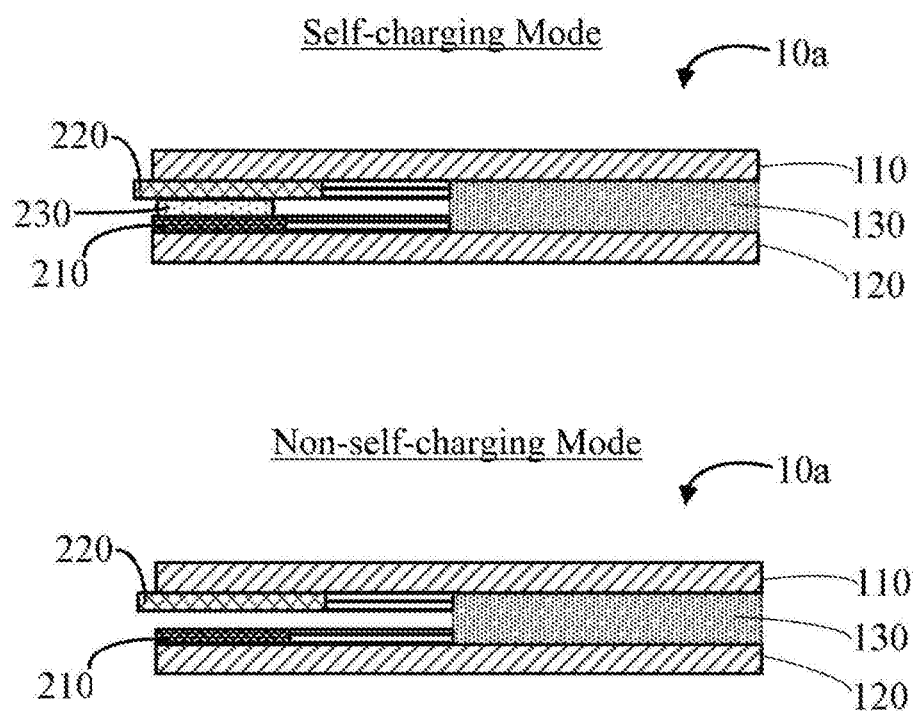
FIG. 4 is a schematic view of one embodiment of the energy storage device operating in self-charging mode and non-self-charging mode, respectively.

Referring to FIG. 4, in self-charging mode, the hygroscopic particles of the separator 220 absorb moisture in the surrounding environment and re-dissolve to form the metal-air battery electrolyte 230, the metal electrode 210 and the supercapacitor first electrode 110 are electrically conducted by the metal-air battery electrolyte 230, the metal-air cell block 200 outputs power to charge the supercapacitor block 100; while in non-self-charging mode, the hygroscopic particles of the separator 220 cannot absorb moisture in the surrounding environment, resulting in the metal electrode 210 and the supercapacitor first electrode 110 not being able to electrically conduct, the metal-air cell block 200 fails to output power.

Figure 5:
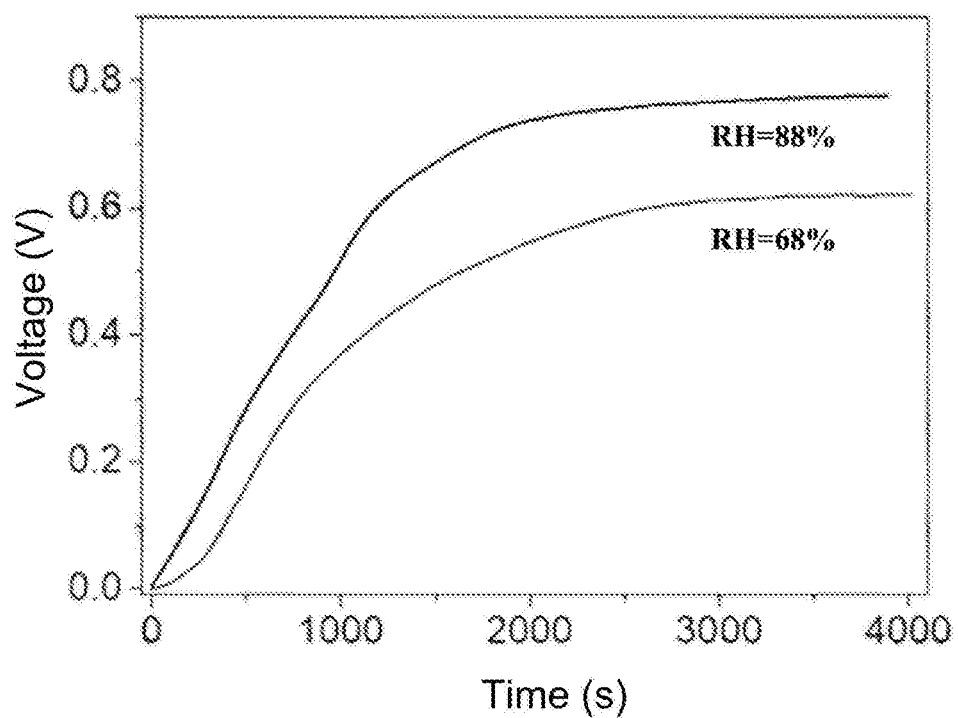
FIG. 5 is an output voltage—charging time curve of the energy storage device under different relative humidity.

FIG. 5 shows an output voltage—charging time curve of the energy storage device 10a under different relative humidity. When the relative humidity of the surrounding environment is 68%, the output voltage of the energy storage device 10a can stably reach more than 0.63V, and when the relative humidity is 88%, the output voltage of the energy storage device 10a can stably reach 0.77 V.

The energy storage device 10a can continuously and stably output electrical energy under certain humidity conditions. The energy storage device 10a can be used as an energy supply device for wearable electronic products. The separator 220 continuously absorbs the water vapor around the human body to achieve continuous energy supply.

The embodiments shown and described above are only examples. Even though numerous characteristics and advantages of the present technology have been set forth in the forego description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. An energy storage device, comprising: a supercapacitor first electrode, a supercapacitor second electrode, a first electrolyte, a metal electrode, and a separator; wherein:
   the supercapacitor first electrode and the supercapacitor second electrode are parallel to and spaced apart from each other, the supercapacitor first electrode, the supercapacitor second electrode, and the first electrolyte together form a supercapacitor;
   the metal electrode and the supercapacitor second electrode form an Ohmic contact, the metal electrode is spaced apart from and opposite to the supercapacitor first electrode to form a first gap, the metal electrode is configured as a negative electrode of a metal-air cell, and the supercapacitor first electrode is configured as a positive electrode of the metal-air cell; and
   the separator is sandwiched between the metal electrode and the supercapacitor first electrode, the separator is configured to absorb moisture in a surrounding environment to electrically conduct the metal electrode and the supercapacitor first electrode.

2. The energy storage device of claim 1, wherein the separator comprises a plurality of hygroscopic particles.

3. The energy storage device of claim 2, wherein the plurality of hygroscopic particles is anhydrous calcium chloride particles, anhydrous calcium sulfate particles, anhydrous magnesium sulfate particles, anhydrous sodium sulfate particles, or anhydrous potassium carbonate particles.

4. The energy storage device of claim 1, wherein the separator is prepared by soaking a metal-air battery separator in a solution with a hygroscopic solute; and removing the solution and drying the metal-air battery separator.

5. The energy storage device of claim 1, wherein the separator is attached to the metal electrode.

6. The energy storage device of claim 1, wherein the separator is attached to the supercapacitor first electrode.

7. The energy storage device of claim 1, wherein a conductive adhesive is located between the metal electrode and the supercapacitor second electrode.

8. The energy storage device of claim 7, wherein the conductive adhesive is silver paste.

9. The energy storage device of claim 1, wherein a material of the metal electrode is selected from the group consisting of magnesium, aluminum, zinc, and iron.

10. The energy storage device of claim 1, wherein a thickness of the metal electrode is in a range from about 25 $\mu$m to about 100 $\mu$m.

11. The energy storage device of claim 1, wherein the supercapacitor first electrode is a carbon nanotube/polyaniline composite film.

12. The energy storage device of claim 11, wherein the carbon nanotube/polyaniline composite film comprises a carbon nanotube network structure and a polyaniline layer.

13. The energy storage device of claim 12, wherein the carbon nanotube network structure is a free-standing film network and comprises a plurality of carbon nanotubes combined by van der Waals attractive force therebetween.

14. The energy storage device of claim 13, wherein the carbon nanotube network structure comprises a plurality of micropores defined by the plurality of carbon nanotubes.

15. An energy storage device, comprising: a supercapacitor first electrode, a supercapacitor second electrode, a first electrolyte, a metal electrode, and a separator; wherein:
   the supercapacitor first electrode, the supercapacitor second electrode, and the first electrolyte together form a supercapacitor;
   the metal electrode and the supercapacitor second electrode form an Ohmic contact, the metal electrode is configured as a negative electrode of a metal-air cell, and the supercapacitor first electrode is configured as a positive electrode of the metal-air cell; and
   the separator is sandwiched between the metal electrode and the supercapacitor first electrode, the separator is configured to absorb moisture in a surrounding environment to electrically conduct the metal electrode and the supercapacitor first electrode.

* * * * *